United States Patent
Doddaiah et al.

(10) Patent No.: US 11,989,099 B1
(45) Date of Patent: May 21, 2024

(54) FORECASTING SNAPSHOT SEASONALITY

(71) Applicant: Dell Products L.P., Hopkinton, MA (US)

(72) Inventors: Ramesh Doddaiah, Westborough, MA (US); Owen Martin, Hopedale, MA (US)

(73) Assignee: Dell Products L.P., Hopkinton, MA (US)

( * ) Notice: Subject to any disclaimer, the term of this patent is extended or adjusted under 35 U.S.C. 154(b) by 64 days.

(21) Appl. No.: 18/079,974

(22) Filed: Dec. 13, 2022

(51) Int. Cl.
  *G06F 11/07* (2006.01)
  *G06F 11/14* (2006.01)

(52) U.S. Cl.
  CPC ...... *G06F 11/1458* (2013.01); *G06F 2201/84* (2013.01)

(58) Field of Classification Search
  CPC .................... G06F 11/1458; G06F 2201/84
  USPC ............... 714/6.2, 20; 707/649, 654, 660
  See application file for complete search history.

(56) References Cited

U.S. PATENT DOCUMENTS

| | | | | |
|---|---|---|---|---|
| 10,824,522 B2* | 11/2020 | Sadavarte | ........... | G06F 11/0757 |
| 11,010,351 B1* | 5/2021 | Potnis | .................. | G06F 9/45558 |
| 11,144,403 B2* | 10/2021 | Doddaiah | ............. | G06F 3/0605 |
| 11,169,889 B1* | 11/2021 | Warfield | ............... | G06F 3/0653 |
| 2014/0059311 A1* | 2/2014 | Oberhofer | ............... | G06F 3/065 |
| | | | | 711/162 |
| 2014/0181039 A1* | 6/2014 | Harrison | ............... | G06F 3/0608 |
| | | | | 707/652 |
| 2016/0077926 A1* | 3/2016 | Mutalik | ............. | G06F 16/1844 |
| | | | | 711/162 |
| 2019/0227878 A1* | 7/2019 | Agarwal | ................. | G06F 8/658 |
| 2022/0129416 A1* | 4/2022 | Vokaliga | ............. | H04L 67/1097 |
| 2024/0004563 A1* | 1/2024 | Singhal | ................. | G06F 3/0631 |

FOREIGN PATENT DOCUMENTS

CN     101512493 B *   9/2012    .......... G06F 11/1458

\* cited by examiner

*Primary Examiner* — Chae M Ko
(74) *Attorney, Agent, or Firm* — Anderson Gorecki LLP

(57) ABSTRACT

A snapshot resource manager running on a storage array forecasts the time-variable need for storage array resources for generation of snapshots. The forecasted resources are accumulated in pools that are pre-allocated for snapshot generation such that the required resources are available when receipt of commands to generate snapshots are received, thereby mitigating the performance impact of snapshot generation on servicing of IOs from instances of host applications.

20 Claims, 4 Drawing Sheets

FORECASTING SNAPSHOT SEASONALITY

TECHNICAL FIELD

The subject matter of this disclosure is generally related to data storage systems.

BACKGROUND

Institutional data storage systems maintain data that is used by instances of host applications that run on host servers. Examples of host applications may include, but are not limited to, software for email, accounting, manufacturing, inventory control, and a wide variety of other institutional processes. A separate storage object or group of storage objects may be created for each host application data image. Each storage object is a logical storage device that abstracts the storage space of arrays of non-volatile disk drives.

Snapshots of storage objects are periodically created to help avoid data loss and maintain data availability. Snapshot creation is prompted by a host server and performed by one or more storage arrays. A standard targeted snapshot is created on an independent storage object, sometimes referred to as a "snap volume," that can be mounted on any storage node. The data in each snap volume typically includes only the changes made to the larger snapped storage object since the most recent snapshot but represents the state of the entire snapped storage object. A sequence of snapshots can be used together to recreate the state of the snapped storage object at various discrete prior points in time. Targetless snapshots use tables of pointers and do not require creation of snap volumes.

SUMMARY

In accordance with some implementations, a method comprises: calculating future snapshot generation intervals and amounts of resources utilized for generation of each snapshot at ends of each of those intervals; accumulating the calculated amounts of the resources before the end of each of the calculated intervals in pools that are pre-allocated for use for snapshot generation; and generating a new snapshot using the pre-allocated resources in response to receipt of a command from a host server.

In accordance with some implementations, an apparatus comprises: non-volatile drives with storage space mapped to at least one storage object; and at least one compute node with a snapshot resource manager configured to: calculate future snapshot generation intervals and amounts of resources utilized for generation of each snapshot at ends of each of those intervals; accumulate the calculated amounts of the resources before the end of each of the calculated intervals in pools that are pre-allocated for use for snapshot generation; and generate a new snapshot using the pre-allocated resources in response to receipt of a command from a host server.

In accordance with some implementations, a non-transitory computer-readable storage medium stores instructions that when executed by a computer cause the computer to perform a method comprising: calculating future snapshot generation intervals and amounts of resources utilized for generation of each snapshot at ends of each of those intervals; accumulating the calculated amounts of the resources before the end of each of the calculated intervals in pools that are pre-allocated for use for snapshot generation; and generating a new snapshot using the pre-allocated resources in response to receipt of a command from a host server.

Other aspects, features, and implementations may become apparent in view of the detailed description and figures. All examples, aspects and features can be combined in any technically possible way.

DETAILED DESCRIPTION

Aspects of the inventive concepts are described as being implemented in a data storage system that includes host servers and storage arrays. Such implementations should not be viewed as limiting. Those of ordinary skill in the art will recognize that there are a wide variety of implementations of the inventive concepts in view of the teachings of the present disclosure. Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof.

Figure 1:
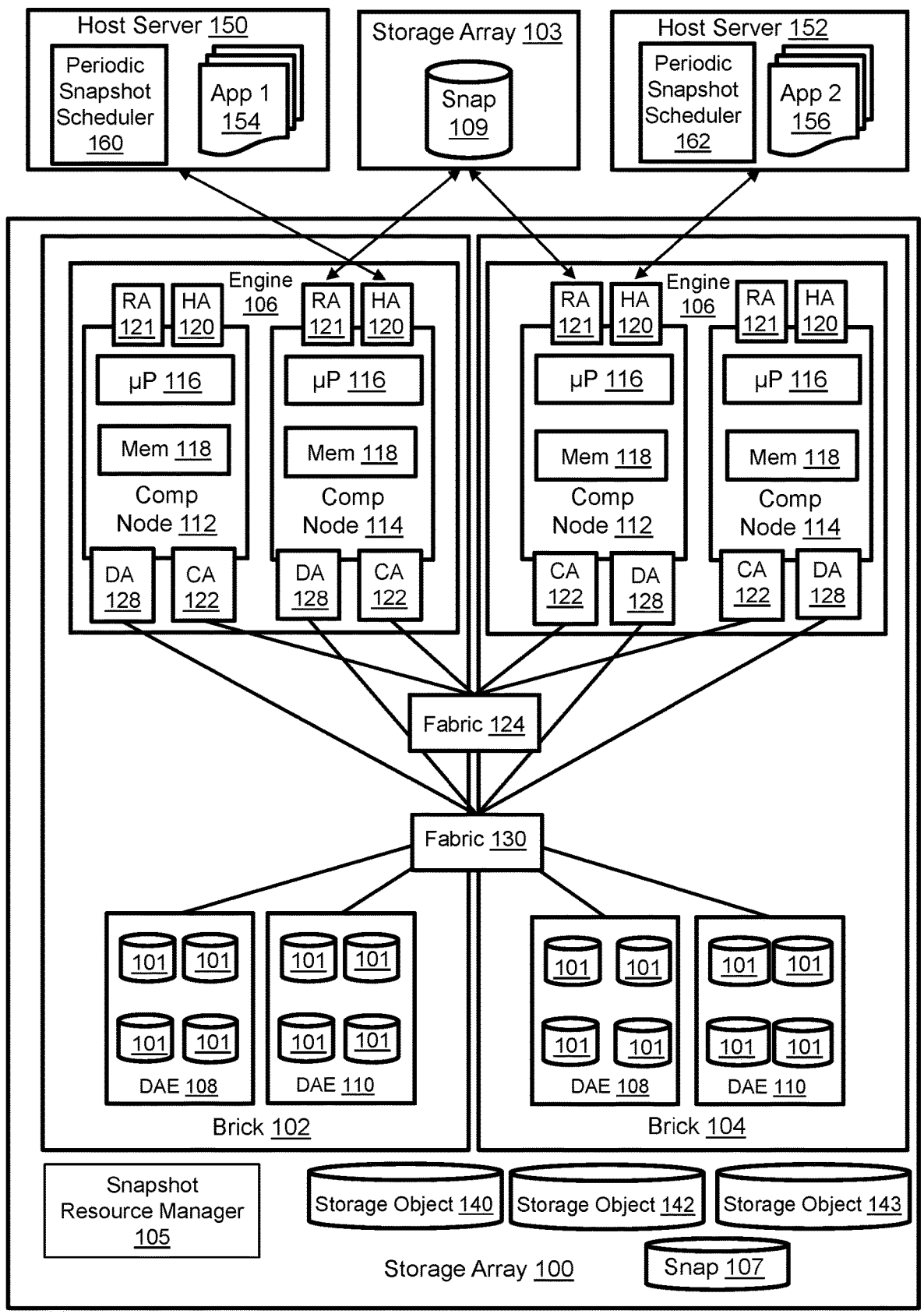
FIG. 1 illustrates a storage array that includes a snapshot resource manager.

FIG. 1 illustrates a storage array 100 that includes a snapshot resource manager 105. The storage array may be a type of storage area network (SAN) in a storage system that includes many host servers, of which host servers 150, 152 are exemplary. Each host server is a computer that includes microprocessors and memory for running instances of host applications 154, 156, such as programs for email, inventory control, accounting, manufacturing, engineering, and any of a wide variety of organizational functions. Storage objects are created to store host application data. Data for instances of host application 154 is maintained on storage object 140. Data for instances of host application 156 is maintained on storage object 143. The host servers include periodic snapshot schedulers 160, 162 that prompt generation of new snapshots of associated storage objects at fixed intervals that define the period of time between successive snapshots. For example, periodic snapshot scheduler 160 might be configured to send commands to cause the storage array to generate new snapshots such as snapshot 107 of storage object 140 every 10 minutes and periodic snapshot scheduler 162 might be configured to send commands to cause the storage array to generate new snapshots such as snapshot 109 of storage object 143 every 5 minutes. As will be explained in greater detail below, the snapshot resource manager 105 forecasts the time-variable need for storage array resources for generation of the snapshots and accumulates the forecasted resources in pools that are pre-allocated for snapshot generation such that the required resources are available when receipt of commands to generate snapshots are received, thereby mitigating the performance impact of snapshot generation on servicing of IOs from instances of host applications.

The storage array 100 is a specialized storage node that includes one or more bricks 102, 104. Each brick includes an engine 106 and one or more drive array enclosures (DAEs) 108, 110. Each DAE includes managed drives 101 that are persistent storage resources. Examples of managed drives may include, without limitation, solid-state drives (SSDs) such as flash and hard disk drives (HDDs) with spinning disk storage media. Each engine 106 includes a pair of interconnected compute nodes 112, 114, which may be referred to as "storage directors." Each compute node includes hardware resources such as at least one multi-core processor 116 and local memory 118. The processor may include Central Processing Units (CPUs), Graphics Processing Units (GPUs), or both. The local memory 118 may include volatile Random-Access Memory (RAM) of any type, Non-Volatile Memory (NVM) such as Storage Class Memory (SCM), or both. Each compute node includes one or more host adapters (HAs) 120 for communicating with the host servers 150, 152. Each HA has hardware resources for servicing IOs, e.g., processors, volatile memory, and ports via which the host servers may access the storage array. Each compute node also includes a remote adapter (RA) 121 for communicating with other storage systems such as remote storage array 103. Each compute node also includes one or more drive adapters (DAs) 128 for communicating with the managed drives 101 in the DAEs 108, 110. Each drive adapter has hardware resources for servicing IOs, e.g., processors, volatile memory, and ports via which the computing node may access the DAEs. Each compute node may also include one or more channel adapters (CAs) 122 for communicating with other compute nodes via an interconnecting fabric 124. An operating system (OS) running on the storage array has resources for servicing IOs and supports a wide variety of other functions. Each compute node may allocate a portion or partition of its respective local memory 118 to a shared memory that can be accessed by other compute nodes, e.g., via Direct Memory Access (DMA) or Remote DMA (RDMA). The paired compute nodes 112, 114 of each engine 106 provide failover protection and may be directly interconnected by communication links. An interconnecting fabric 130, which may be integrated with fabric 124, enables implementation of an N-way active-active backend. A back-end connection group includes all DAs that can access the same drive or drives. In some implementations every DA 128 in the storage array can reach every DAE via the fabric 130. Further, in some implementations every DA in the storage array can access every managed drive 101 in the storage array. The snapshot resource manager 105 may include program code stored in the memory 118 of the compute nodes and executed by the processors 116 of the compute nodes.

Figure 2:
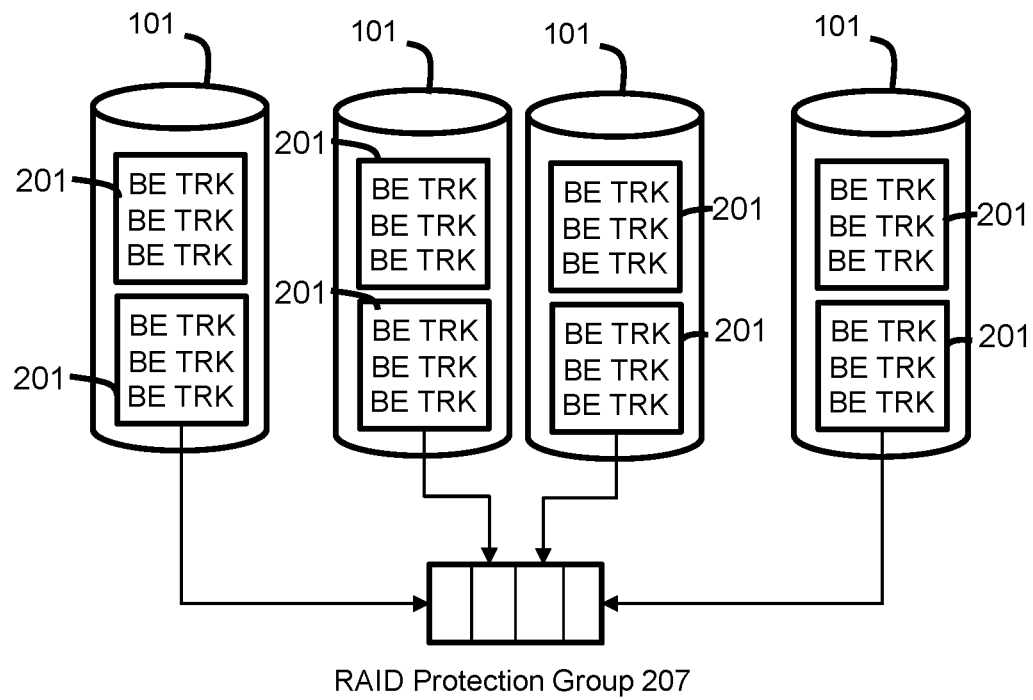
FIG. 2 illustrates layers of abstraction between storage objects and the managed drives.
Figure 2:
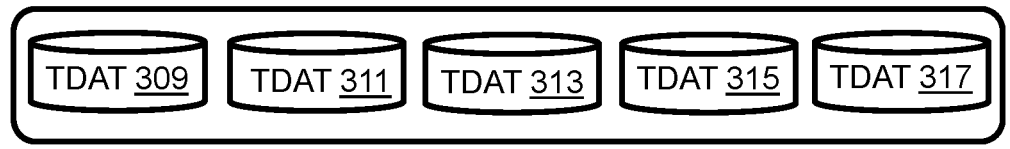
Figure 2:
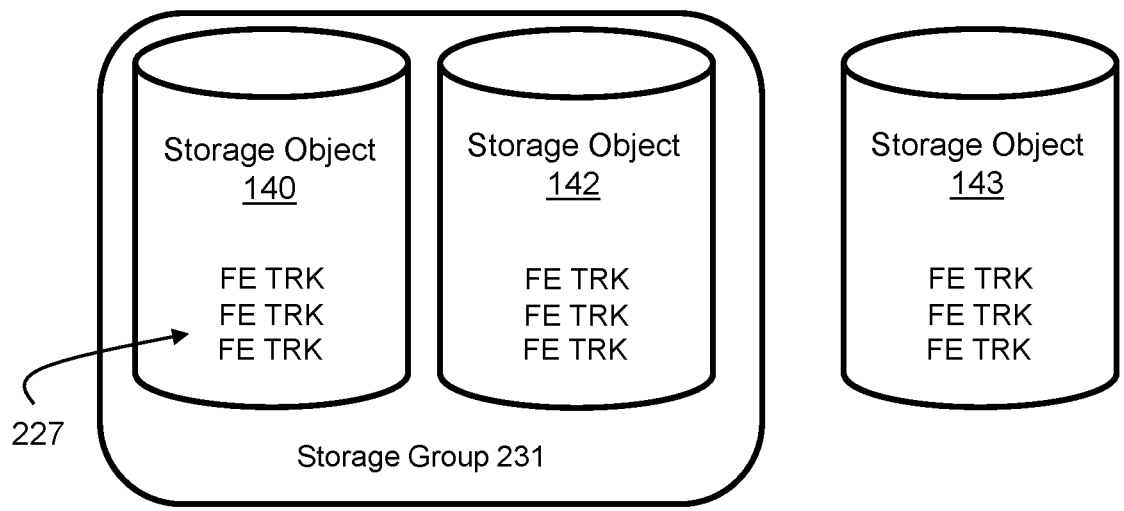

Referring to FIGS. 1 and 2, the host application data that is logically stored on storage objects 140, 142, 143 is persistently stored on the managed drives 101. Without limitation, storage objects may be referred to as volumes, devices, or LUNs, where a logical unit number (LUN) is a number used to identify logical storage volumes in accordance with the small computer system interface (SCSI) protocol. From the perspective of the host servers, each production storage object is a single disk drive having a set of contiguous logical block addresses (LBAs) on which data used by the instances of a host application resides. However, the host application data is stored at non-contiguous addresses on various managed drives 101. The compute nodes 112, 114 maintain metadata that maps between the LBAs of the production storage objects and physical addresses on the managed drives. The basic allocation unit of storage capacity that is used by the compute nodes 112, 114 to access the managed drives 101 is a back-end track (BE TRK). The managed drives may be configured with partitions or splits 201, each of which may contain multiple BE TRKs. A group of partitions or splits from different managed drives is used to create a RAID protection group 207. A storage resource pool 205 is a storage object that includes a collection of RAID protection groups 207 of the same type, e.g., RAID-5 (3+1). Storage resource pools are used to create the production storage objects that are accessed by instances of host applications. The host application data is logically stored in front-end tracks (FE TRKs) on the production storage objects. The FE TRKs are mapped to the BE TRKs and vice versa by FE TRK IDs and BE TRK IDs, which are pointers that are maintained in the shared memory. A storage group 231 of multiple storage objects 140, 142 may be created for an individual host application. Multiple instances of a single host application may use data from the same storage object or storage group, but instances of different host applications do not use data from the same storage object or storage group. The storage array may maintain a large number of production storage objects and storage groups.

Figure 3:
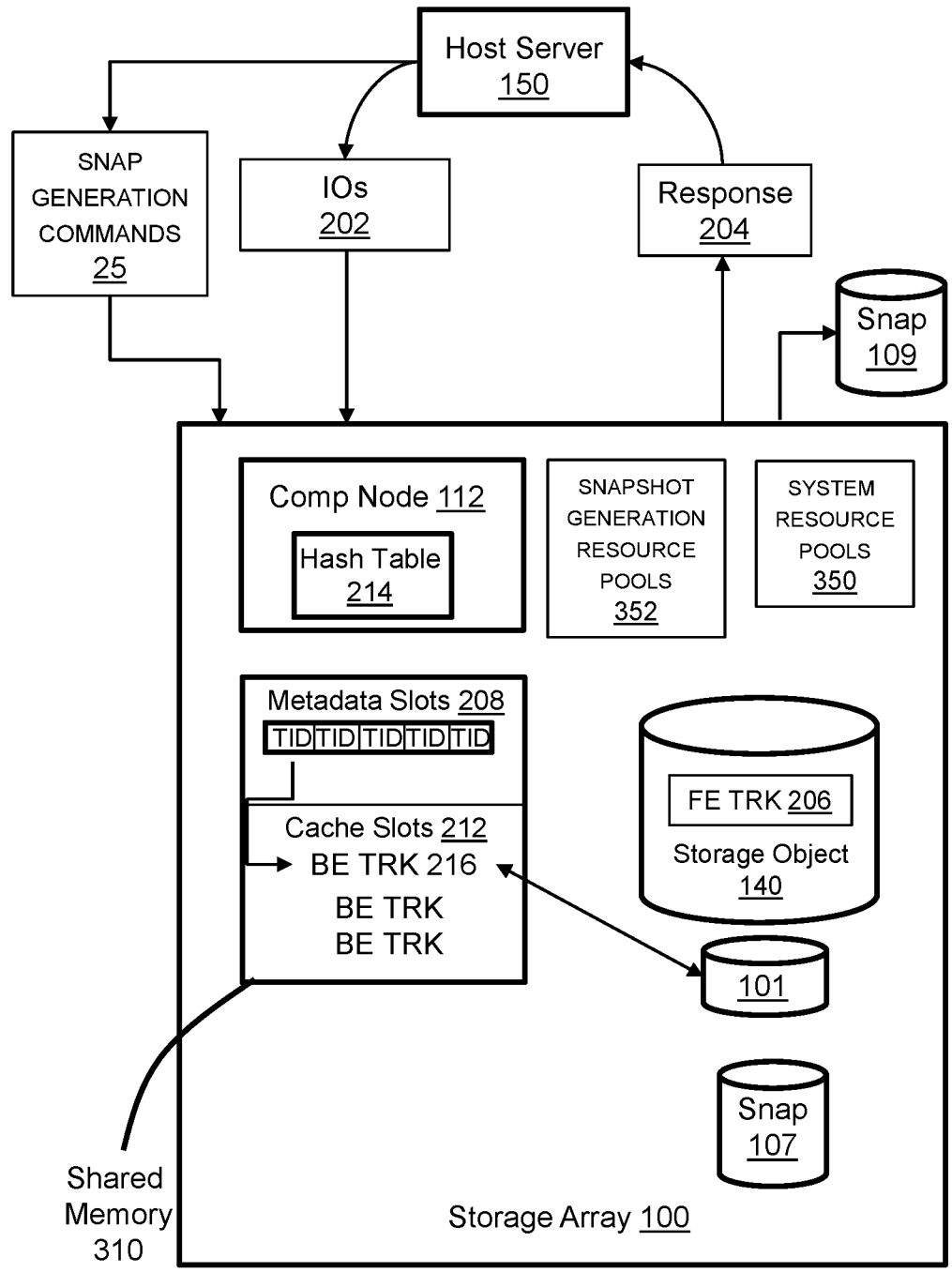
FIG. 3 illustrates utilization of resources for servicing IOs and generating snapshots.

FIG. 3 illustrates utilization of storage array resources for servicing IOs and generating snapshots. An IO 202 may be a Write command or a Read command from host server 150. A response 204 to the IO 202 is an Ack in the case of a Write command and data in the case of a Read command. For purposes of explanation the IO 202 is a Write to a FE TRK 206 that is logically stored on storage object 140. Metadata slots 208 are a first portion of the shared memory 310 that is allocated for metadata maintained in track IDs (TIDs). Cache slots 212 are a second portion of the shared memory 310 that is allocated for host application data, which is maintained in BE TRKs. The TIDs contain pointers that map FE TRKs in storage objects to BE TRKs in the cache slots and managed drives. In response to IO 202, the compute node 112 identifies the TID corresponding to FE TRK 206 by inputting information such as the device number, track, and size obtained from the IO 202 into a hash table 214. The hash table 214 indicates the location of the TID in the metadata slots 208. The TID is obtained from the metadata slots and used by the compute node 200 to find BE TRK 216 in the cache slots 212. If BE TRK 216 is not in the cache slots 212, then a free cache slot is allocated from the system resource pools 350 which are replenished in the background by recycling algorithms. The Write data associated with the IO is written to the identified or allocated BE TRK in the cache slots and the TID is updated. An Ack is then returned to the host server. The BE TRK data in the cache slots is eventually destaged to the managed drives 101 in storage space allocated from the system resource pools 350.

The storage array generates snapshots such as snap 107 of storage object 140 in response to receipt of snap generation commands 25 from host server 150. The procedure for generation of a consistent snapshot of a production storage object at a production site generally includes temporarily halting IOs to the storage object while the consistent snapshot is generated by creating a new snapshot volume, determining which storage object data has changed since the most recent snapshot of the storage object was generated, and updating the metadata and data in shared memory and the managed drives accordingly to create the point-in-time record of the state of the storage object. A non-consistent snapshot is generated based on data that has been destaged to the managed drives. Other data, including data associated with in-flight IOs from hosts and dirty data buffered in the cache hierarchy, is not included in the non-consistent snapshot. The snapshots may be stored locally, e.g., snapshot 107, or stored remotely, e.g., snapshot 109. Regardless of whether the snap is consistent, non-consistent, local, remote, targeted, or targetless, the same types of storage array resources that are used for servicing IOs are also used for snapshot generation.

The snapshot resource manager maintains snapshot generation resource pools 352 that contain storage array resources that are pre-allocated for use for snapshot generation. The snapshot generation resource pools, which may include pools of storage space on the managed drives 101, metadata slots 208, cache slots 212, and other resources described herein, are separate from the system resource pools 350 and are not available for servicing IOs. However, after utilization for snap generation, the resources may be recycled to either the snapshot generation resource pools 352 or the system resource pools 350. The snapshot resource manager calculates the time-varying amounts of different types of resources required for the snapshot generation pools and accumulates those resources over time in the background such that forecasted amounts of the different types of resources are available when receipt of a command to generate a snapshot is expected. The resource requirements and expected snapshot generation times may vary per storage object so each storage object may be managed separately.

Figure 4:
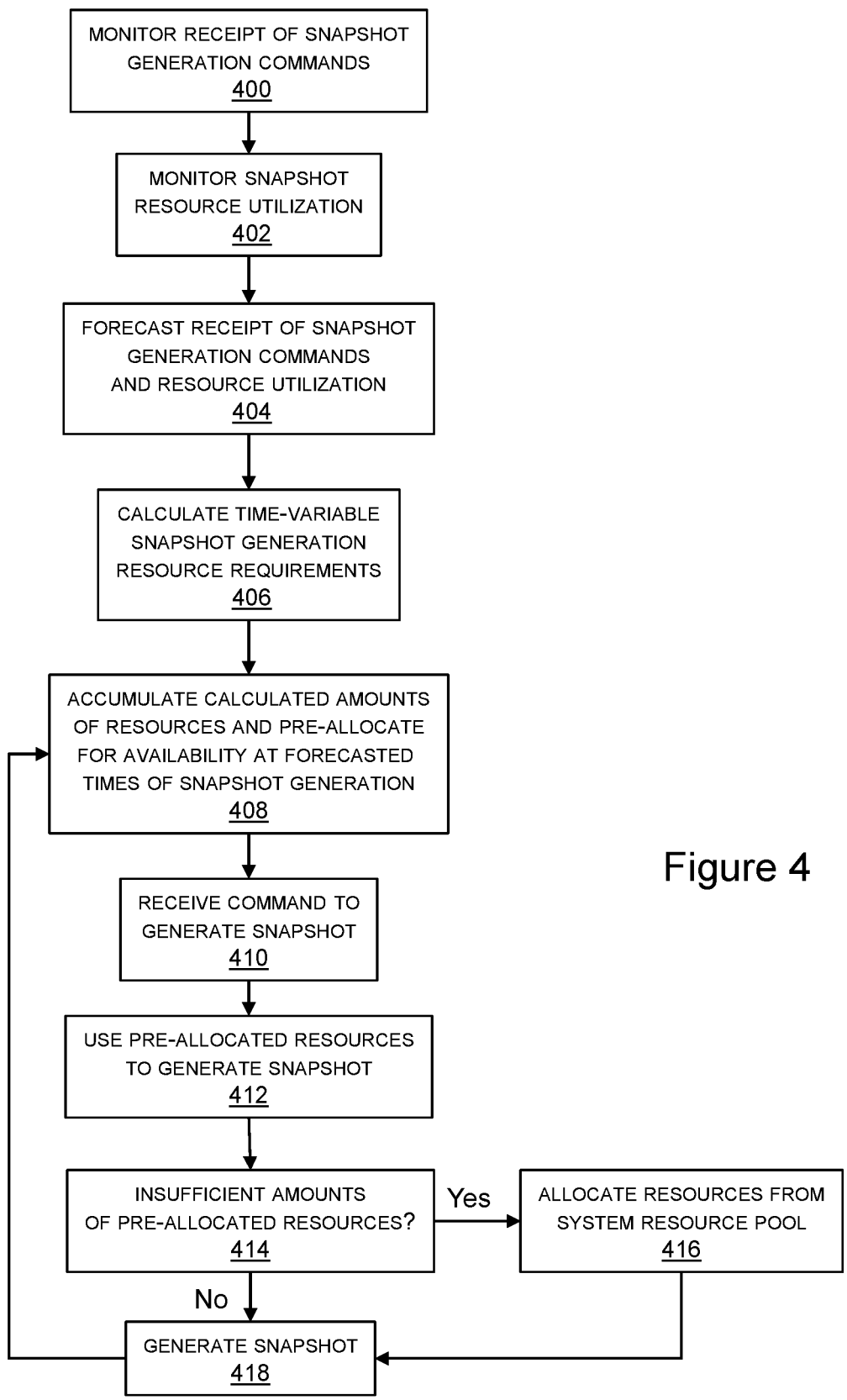
FIG. 4 illustrates a process implemented by the snapshot resource manager.

FIG. 4 illustrates a process implemented by the snapshot resource manager. The process may be implemented separately for each storage object. Step 400 is monitoring receipt of snapshot generation commands from host servers. The time of receipt is recorded along with the storage object to be snapped. Step 402 is monitoring snapshot resource utilization. The various types of resources used to generate the snapshots is recorded and associated with the storage object and time of receipt of the snap generation command. Step 404 is using the recorded information to forecast receipt of future snapshot generation commands for the storage object and the resources that will be utilized to generate those snapshots. Step 406 is using the forecast to calculate the time-variable resource requirements for snapshot generation. For example, the snapshot resource manager might calculate that N metadata slots are required at 10-minute intervals. Step 408 is accumulating the calculated amounts of resources and pre-allocating the accumulated resources in snapshot generation resource pools such that the calculated required amounts of the resources are available at the time when receipt of a snapshot generation command is expected. The rate at which resources are accumulated may be non-linear and adjusted to achieve just-in-time availability based on an anticipated rate at which the resources can be gathered. Step 410 is receiving a command from a host to generate a snapshot. Step 412 is using the pre-allocated resources from the snapshot generation resource pools to generate the snapshot. If less than the pre-allocated amount of any of the resources is utilized for snapshot generation, then the unutilized resources are retained in the snapshot generation resource pools. If more than the pre-allocated amount of any of the resources is needed for snapshot generation as determined in step 414, then the additional resources are allocated from the system resource pools as indicated in step 416. The snapshot is generated in step 418 and accumulation of resources in the snapshot generation resource pools for the next snapshot generation cycle resumes in step 408.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
    calculating future snapshot generation intervals and amounts of resources utilized for generation of each snapshot at ends of each of those intervals;
    accumulating the calculated amounts of the resources before the end of each of the calculated intervals in pools that are pre-allocated for use for snapshot generation; and
    generating a new snapshot using the pre-allocated resources in response to receipt of a command from a host server.

2. The method of claim 1 further comprising retaining unutilized resources in the pools.

3. The method of claim 2 further comprising obtaining additional required resources for generating the new snapshot from system resource pools.

4. The method of claim 3 further comprising monitoring receipt of snapshot generation commands.

5. The method of claim 4 further comprising monitoring amounts of the resources utilized to generate snapshots in response to the snapshot generation commands.

6. The method of claim 5 further comprising calculating future snapshot generation intervals and amounts of resources utilized for generation of each snapshot at ends of each of those intervals based on the monitored snapshot generation commands and monitored amounts of the resources utilized to generate snapshots in response to those snapshot generation commands.

7. The method of claim 6 further comprising calculating time-variable snapshot generation resource requirements for each of a plurality of storage objects.

8. An apparatus comprising:
    non-volatile drives with storage space mapped to at least one storage object; and at least one compute node with a snapshot resource manager configured to:
- calculate future snapshot generation intervals and amounts of resources utilized for generation of each snapshot at ends of each of those intervals;
- accumulate the calculated amounts of the resources before the end of each of the calculated intervals in pools that are pre-allocated for use for snapshot generation; and
- generate a new snapshot using the pre-allocated resources in response to receipt of a command from a host server.

9. The apparatus of claim 8 further comprising the snapshot resource manager configured to retain unutilized resources in the pools.

10. The apparatus of claim 9 further comprising the snapshot resource manager configured to obtain additional required resources for generating the new snapshot from system resource pools.

11. The apparatus of claim 10 further comprising the snapshot resource manager configured to monitor receipt of snapshot generation commands.

12. The apparatus of claim 11 further comprising the snapshot resource manager configured to monitor amounts of the resources utilized to generate snapshots in response to the snapshot generation commands.

13. The apparatus of claim 12 further comprising the snapshot resource manager configured to calculate future snapshot generation intervals and amounts of resources utilized for generation of each snapshot at ends of each of those intervals based on the monitored snapshot generation commands and monitored amounts of the resources utilized to generate snapshots in response to those snapshot generation commands.

14. The apparatus of claim 13 further comprising the snapshot resource manager configured to calculate time-variable snapshot generation resource requirements for each of a plurality of storage objects.

15. A non-transitory computer-readable storage medium storing instructions that when executed by a computer cause the computer to perform a method comprising:
- calculating future snapshot generation intervals and amounts of resources utilized for generation of each snapshot at ends of each of those intervals;
- accumulating the calculated amounts of the resources before the end of each of the calculated intervals in pools that are pre-allocated for use for snapshot generation; and
- generating a new snapshot using the pre-allocated resources in response to receipt of a command from a host server.

16. The non-transitory computer-readable storage medium of claim 15 in which the method further comprises retaining unutilized resources in the pools.

17. The non-transitory computer-readable storage medium of claim 16 in which the method further comprises obtaining additional required resources for generating the new snapshot from system resource pools.

18. The non-transitory computer-readable storage medium of claim 17 in which the method further comprises monitoring receipt of snapshot generation commands and monitoring amounts of the resources utilized to generate snapshots in response to the snapshot generation commands.

19. The non-transitory computer-readable storage medium of claim 18 in which the method further comprises calculating future snapshot generation intervals and amounts of resources utilized for generation of each snapshot at ends of each of those intervals based on the monitored snapshot generation commands and monitored amounts of the resources utilized to generate snapshots in response to those snapshot generation commands.

20. The non-transitory computer-readable storage medium of claim 19 in which the method further comprises calculating time-variable snapshot generation resource requirements for each of a plurality of storage objects.

\* \* \* \* \*